(No Model.)
G. D. BURTON.
STOCK CAR.
No. 311,719. Patented Feb. 3, 1885.
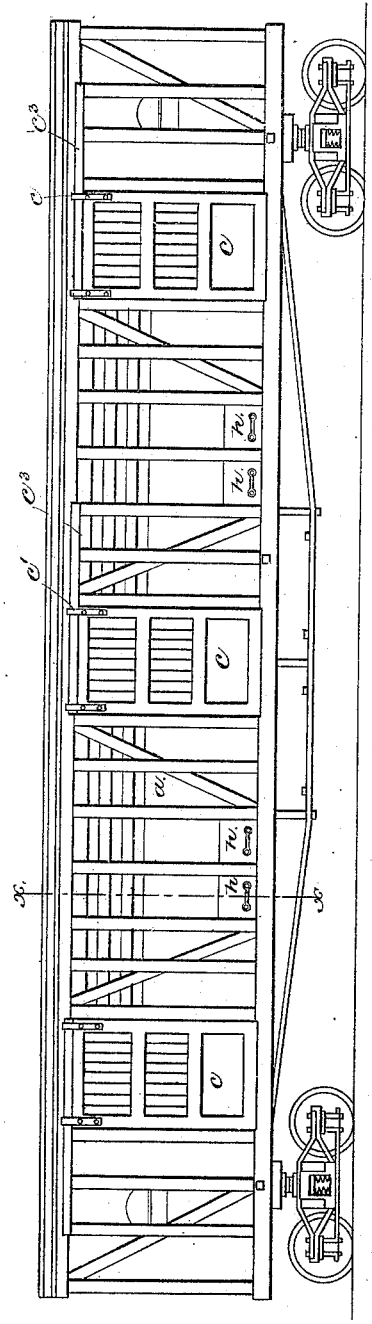
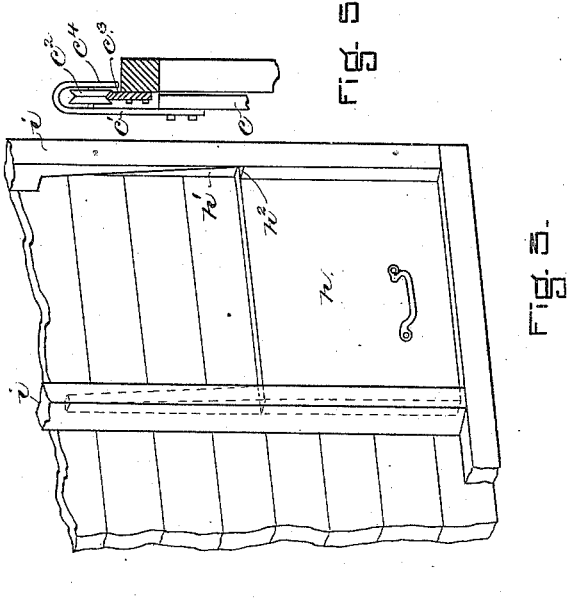
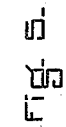
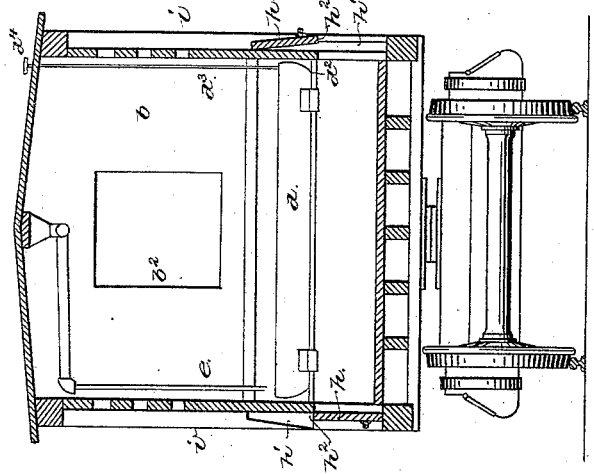
WITNESSES.
Chas. T. Adams.
Levi H. Clement.
INVENTOR.
Geo. D. Burton.

(No Model.)   2 Sheets—Sheet 2.

G. D. BURTON.
STOCK CAR.

No. 311,719.   Patented Feb. 3, 1885.

Witnesses:
Chas. F. Adams.
Levi H. Clement.

Inventor:
Geo. D. Burton.

UNITED STATES PATENT OFFICE.

GEORGE D. BURTON, OF BOSTON, MASSACHUSETTS.

STOCK-CAR.

SPECIFICATION forming part of Letters Patent No. 311,719, dated February 3, 1885.

Application filed June 23, 1884. (No model.)

*To all whom it may concern:*

Be it known that I, GEORGE D. BURTON, of Boston, county of Suffolk, State of Massachusetts, have invented an Improvement in Stock-Cars, of which the following description, in connection with the accompanying drawings, is a specification, like letters on the drawings representing like parts.

My invention relating to stock-cars is shown embodied in a car especially intended for transporting valuable animals, the said cars being in some instances connected with passenger-trains, so that they may be conveyed in the same train with their owners. The car is divided by transverse partitions into compartments for the animals, and also has separate compartments at one or both ends for the accommodation of the attendants; and the car is also provided with doors at its ends and openings in the transverse partitions, so that an attendant in the compartment at the end of the car will be able to see through the series of compartments occupied by the animals.

The invention consists in the general arrangement of the car and in various details of construction hereinafter described.

Figure 6:
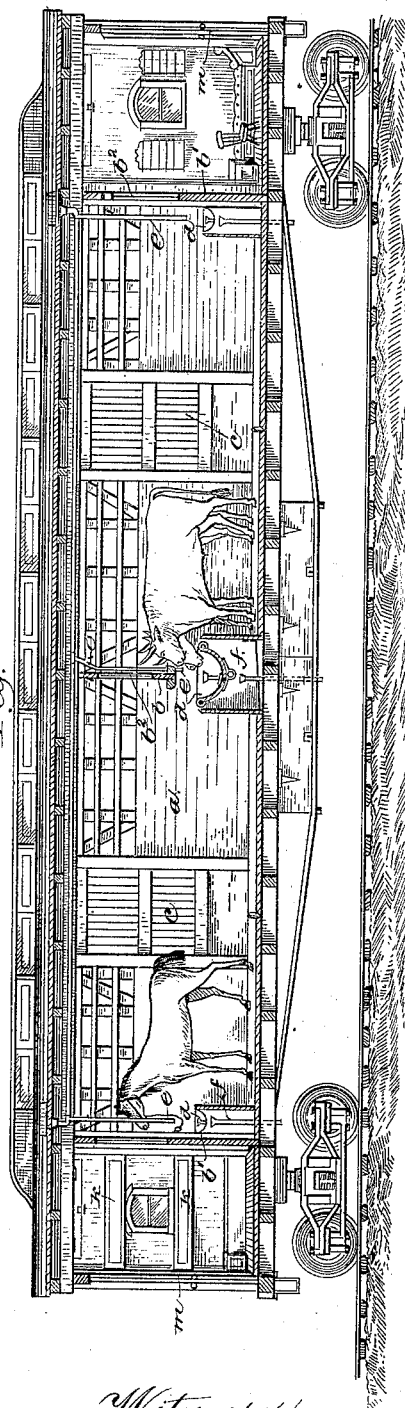
Figure 7:
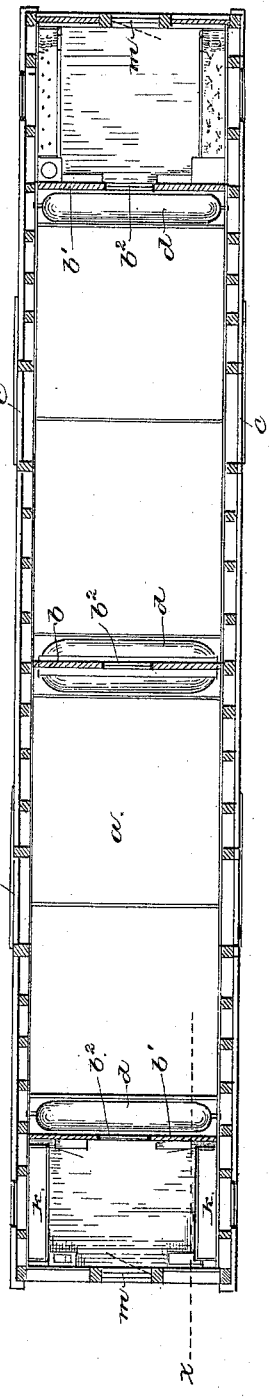
Figure 8:
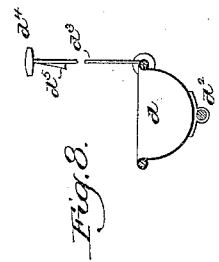

Figure 1 is a side elevation of a stock-car embodying this invention; Fig. 2, a transverse section thereof on line $x\ x$; Fig. 3, a perspective detail showing one of the doors in the side of the car affording access to the space beneath the feed-troughs; Figs. 4 and 5, details showing an improved device for hanging the door; Fig. 6, a longitudinal vertical section showing the interior of the car; Fig. 7, a horizontal section thereof, and Fig. 8 a detail showing the mechanism for operating the feed-trough.

The car-body $a$, of suitable or usual construction, is provided with partitions $b$, dividing it into separate compartments entered by suitable doors, $c$, at the sides of the car, the said compartments being provided with feed-troughs $d$ and watering devices $e$, and boxes $f$ beneath the feed-troughs, substantially as shown in Letters Patent No. 298,666, granted to me May 13, 1884, to which reference may be had. The doors $c$, instead of sliding upon rails at the inside of the car, as heretofore, are provided at their upper ends with hook-shaped brackets or hangers $c'$, serving as bearings for grooved rollers $c^2$, running on tracks or rails $c^3$ on the outside of the car above the top of the door, the end of the hook $c'$ being extended down, as shown at $c^4$, below the upper edge of the rail $c^3$, and thus serving as a guard to prevent the door from being thrown off from the said rail, and also to prevent undue swinging of the lower portion of the door outward from the side of the car.

In the car shown in my former patent referred to, the ends of the boxes $f$ were provided with doors opening from the outside of the car to enable the said boxes to be cleaned, the said doors being hung upon hinges, and thus being likely to open accidentally while the car is in motion, and, by striking cars or other objects, to become detached or broken. This objection is obviated in the present invention by making the doors $h$ at the ends of the boxes $f$ slide vertically in guides $h'$ in the upright timbers $i$ at the sides of the car, the said guides being substantially twice the height of the doors and having the upper half inclined, as shown in Figs. 2 and 3, forming a shoulder, $h^2$, upon which the door $h$ is supported when raised to afford access to the boxes $f$.

The partitions $b'$ near the end of the car extend to the floor thereof, as shown in Fig. 6, thus forming compartments for the attendants having the care of the live stock, one of the said compartments being preferably provided with bunks $k$, and the other with suitable furniture to be used in the day-time, and the said compartments having doors $m$ at the ends of the car, so that when the car is connected with the usual passenger-trains persons can pass from the adjacent car into the compartment of the stock-car without difficulty.

The partitions $b$ at the intermediate part of the car terminate above the feed-troughs, as described in my former patent, so that a single trough answers for two adjacent compartments, and all the partitions $b\ b'$ have doors or openings $b^2$ in line with one another, so that the attendants in the compartments at the end of the car may see through the car.

The troughs $d$, pivoted on shafts $d^2$, as described in my former patent, are provided with operating-rods $d^3$, having handles $d^4$ (best shown in Fig. 8) passing up to the top of the car, so that a person on the top of the car can, by lifting the said handles, turn the said troughs on their shafts to discharge their contents, and the rods $d^3$ are provided with shoulders $d^5$, to enable them to be retained in an elevated position with the troughs $d$ inverted, or in position to empty their contents.

The herein-described car is especially intended for the transportation of valuable horses or live stock in connection with passenger-trains, so that the said live stock may accompany the owner, and the end compartment of the car, or one at least of the said compartments, is intended to be properly furnished for the comfort of the owner, who can enter the said compartment through the end door from the remainder of the train without inconvenience, and by reason of the openings $b^2$ in the different compartments would be able to look through the car and inspect the condition of the animals therein, so as to be assured that they are properly cared for.

I claim—

1. In a stock-car, the combination of the troughs $d$ and boxes $f$ thereunder, with the vertically-sliding doors $h$ at the sides of the car affording access to the said boxes, and the timbers $i$, provided with shouldered guides for the said doors, which have a vertical sliding movement in the said guides, and may be retained thereby in an elevated position, substantially as described.

2. The car-body provided with partitions $b$ $b'$, forming apartments at the middle of the car for live stock, and separate compartments for the attendants or other persons at the end of the car, the said middle compartments being provided with appliances for feeding and watering the live stock, combined with doors at the end of the car entering the said compartments, the said partitions being provided with openings $b^2$, affording a view through the entire length of the car from the end compartments, substantially as described.

3. The car-body having at its middle portion compartments for live stock and doors at the side of the car, combined with compartments at the ends of the car for the attendants of the live stock, and doors at the ends of the car entering the said compartments, substantially as described.

In testimony whereof I have signed my name to this specification in the presence of two subscribing witnesses.

GEO. D. BURTON.

Witnesses:
 EDWARD L. HILL,
 JOS. P. LIVERMORE.